INVENTOR.
Bobby M. Wall

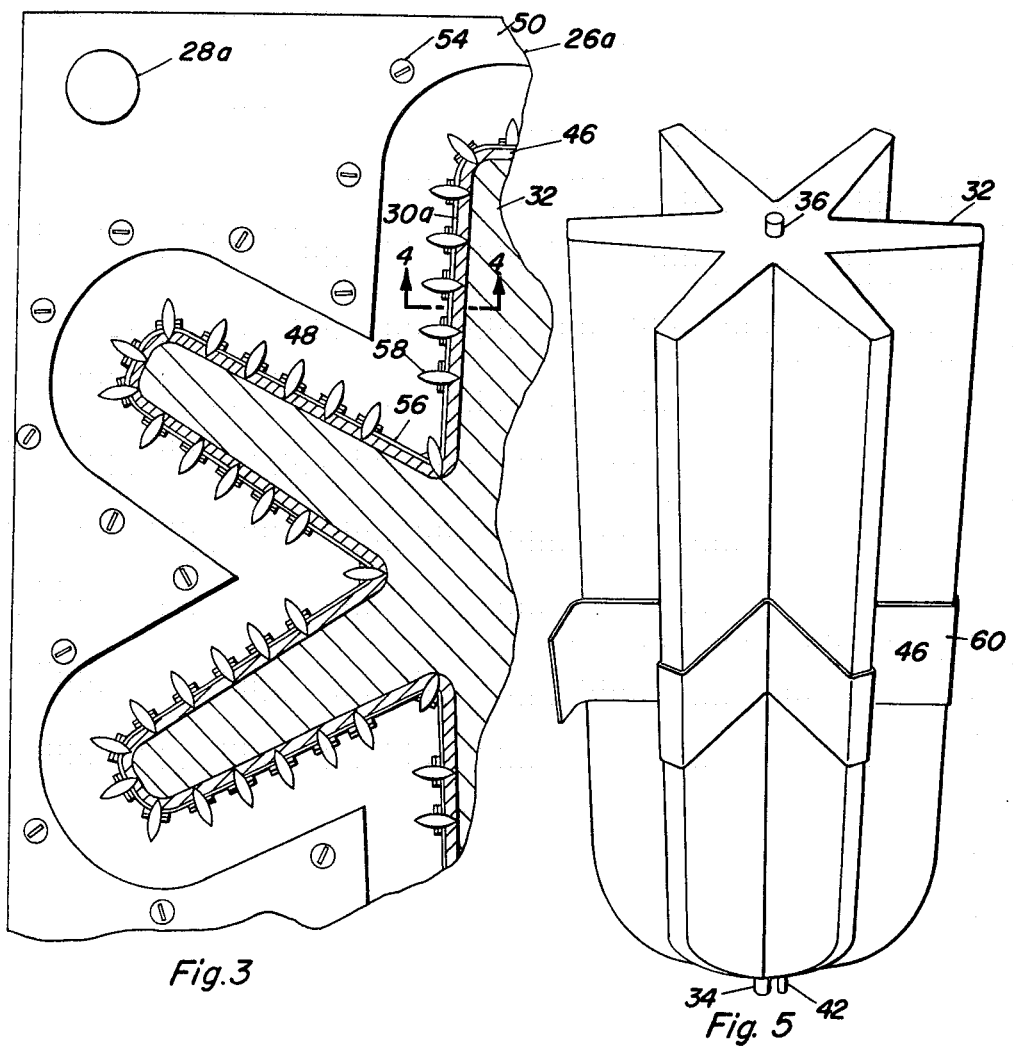
Fig. 3
Fig. 5
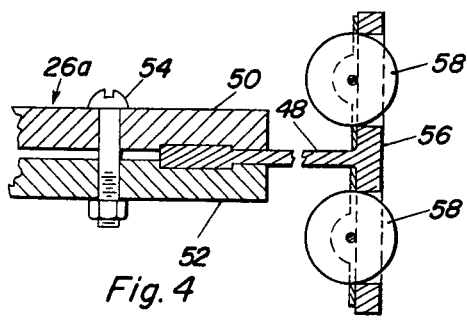
Fig. 4
INVENTOR.
Bobby M. Wall

*INVENTOR.*
Bobby M. Wall

INVENTOR.
Bobby M. Wall

Curtis, Morris & Safford
ATTORNEYS

United States Patent Office 3,380,251
Patented Apr. 30, 1968

3,380,251
IGNITION CONTROL OF SOLID PROPELLANT
ROCKET ENGINES
Bobby M. Wall, Brigham City, Utah, assignor to Thiokol
Chemical Corporation, Bristol, Pa., a corporation of
Delaware
Original application Mar. 3, 1963, Ser. No. 265,790.
Divided and this application Mar. 1, 1966, Ser. No.
530,834
6 Claims. (Cl. 60—219)

This invention relates to controlling rocket motors of the type using a solid propellant and more particularly to controlling the pressure produced by a solid propellant at the time of ignition by applying a combustion-inhibiting composition to certain portions of the ignition surface of the propellant charge.

This application is a division of my prior copending application Ser. No. 265,790 filed Mar. 3, 1963 now Patent No. 3,250,829 and entitled Method of Making a Combustion-Inhibiting Solid Propellent Grain and relates back to said application for all common subject matter.

The typical solid propellant rocket motor comprises a thin-walled high-strength case, containing a propellant charge having a central combustion chamber therein. High performance rocket engines operate at high internal pressures and are designed for minimum weight such that the operating pressure induces stresses in the pressure vessel wall which approach the yield strength thereof. A characteristic of many solid propellant rocket motors with conventional ignition means is that, upon ignition, the internal pressure builds up in a fraction of a second to a pressure peak which is substantially above the operating pressure for which the motor is designed. This peak could induce stresses in the vessel wall that could exceed the strength of the wall material; or the excessive rate of pressurization could cause a higher than desired rate of acceleration since the thrust is proportional to the chamber pressure. Hence, it has been necessary to devise a means for eliminating the initial pressure peak, or reducing it to a practical level such that the pressure vessel is not damaged. Frequently efficiency and desired pressurization rates make it necessary that the pressure build-up occur as rapidly as possible; in other situations a very low rate of pressurization may be desired.

One method of controlling undesirable ignition pressure peaks is to apply a combustion-inhibiting substance to the ignition surface of the propellant charge. This substance is typically a mastic elastomeric sealant having char rates or a burning rate, slower than that of the propellant. In the past it has been applied to those portions of the ignition surface of the propellant charge which have been accessible to manual application, i.e., the surfaces near the aft end of the propellant charge, limited by the distance a man can reach. The inhibiting material used is formulated so as to cure and bond to the propellant surface at ambient temperature.

Although the process practiced in this manner reduces the ignition pressure peak to some extent, neither the application of the material nor the rocket motor performance are reproducible. It is very difficult to control the thickness of the combustion-inhibiting composition when it is applied in this manner, and control of the thickness is essential for predictable performance of the rocket motor. Also, a wax release agent is commonly used on the mandrel that molds the combustion chamber in a solid propellant charge as it solidifies; and, before the combustion inhibiting composition can be applied to a surface formed in this manner, the wax must be removed by scraping it from the propellant. This scraping can produce a roughened surface on the prollant which upon ignition could greatly add to the pressure buildup in the rocket motor. Also, it is theorized that one reason for the pressure buildup in the rocket engine is that the gases from the ignition device, striking the propellant surface at high velocity, tend to tear off small pieces of the propellant in an erosive manner which greatly increases the burning surface of the propellant for a very short period of time. This erosive effect is greatly increased by any roughening of the propellant surface.

My invention is directed to a method of and apparatus for applying a combustion-inhibiting composition onto selected portions of the ignition surface of a solid propellant rocket charge.

An object of my invention is to minimize erosive burning upon ignition of the solid-propellant charge of a rocket by incorporating a smooth-surfaced combustion-inhibiting composition on the ignition surface thereof.

Another object of my invention is to control the thickness of the combustion-inhibiting composition that is applied to the ignition surface of a solid-propellant rocket charge.

Another object of my invention is to provide an apparatus for applying a combustion inhibiting composition to any desired portion of a solid propellant rocket charge.

Another object of my invention is to provide an apparatus that greatly facilitates the application of a combustion-inhibiting composition to the surface of a solid propellant rocket charge.

Still another object is to selectively predetermine the pressure pattern which will be produced in a rocket engine when a solid propellant grain is ignited by varying the amount of the surface area inhibited, the location of the inhibitor and/or the thickness of the inhibiting layer.

Other objects and advantages of my invention will become apparent as the following description is read in reference to the accompanying drawings, wherein the same parts are designated by identical characters throughout the views.

FIGURE 3 is a fragmentary view of a modified form of shaping template on the apparatus shown in FIGURE 1 to adapt it for use on noncylindrical mandrels;

FIGURE 4 is a partial sectional taken on the line 4—4 of FIGURE 3;

FIGURE 5 is a perspective view of a typical mandrel for forming the ignition surface of a solid-propellant rocket charge, showing how the combustion-inhibiting composition may be applied thereto in the form of sheets;

Figure 6:
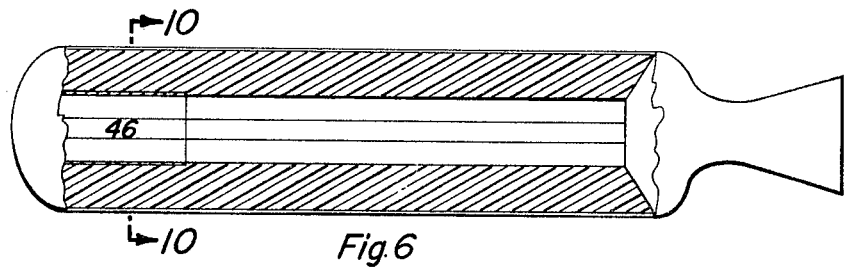
Figure 7:
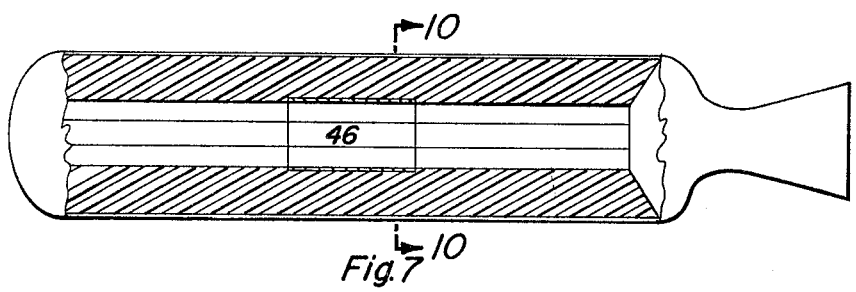
Figure 8:
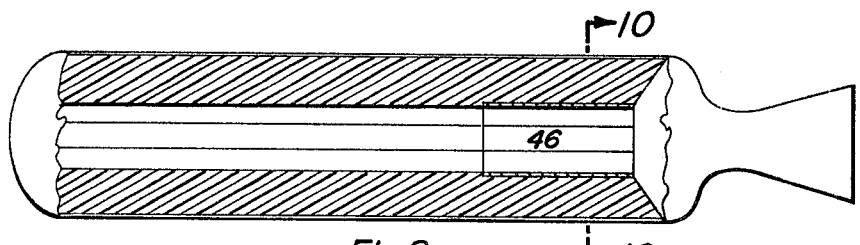
Figure 9:
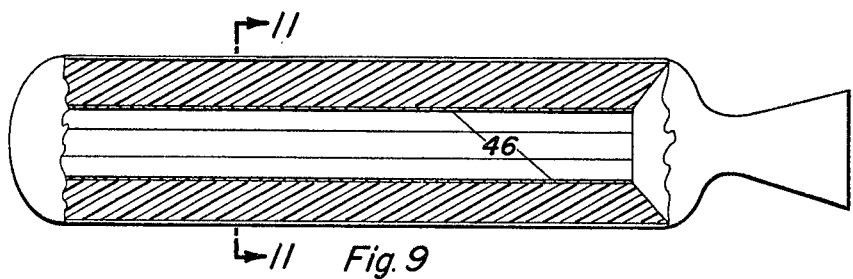
Figure 10:
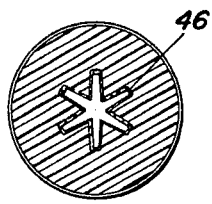
Figure 11:
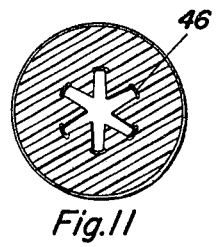
Figure 12:
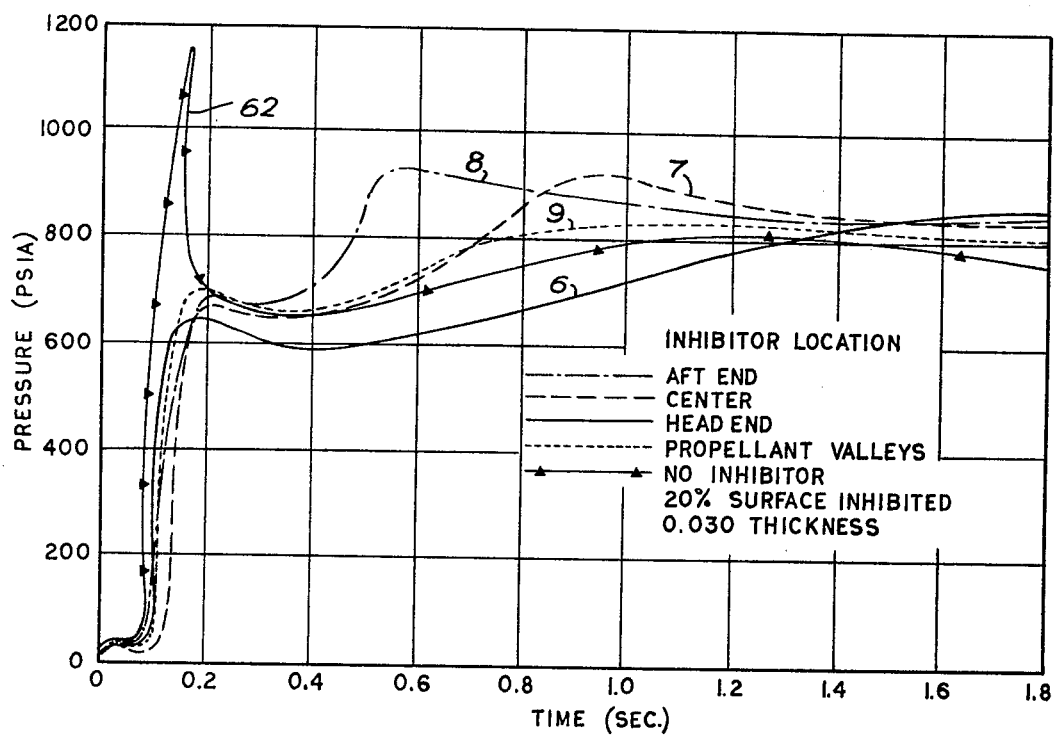
Figure 13:
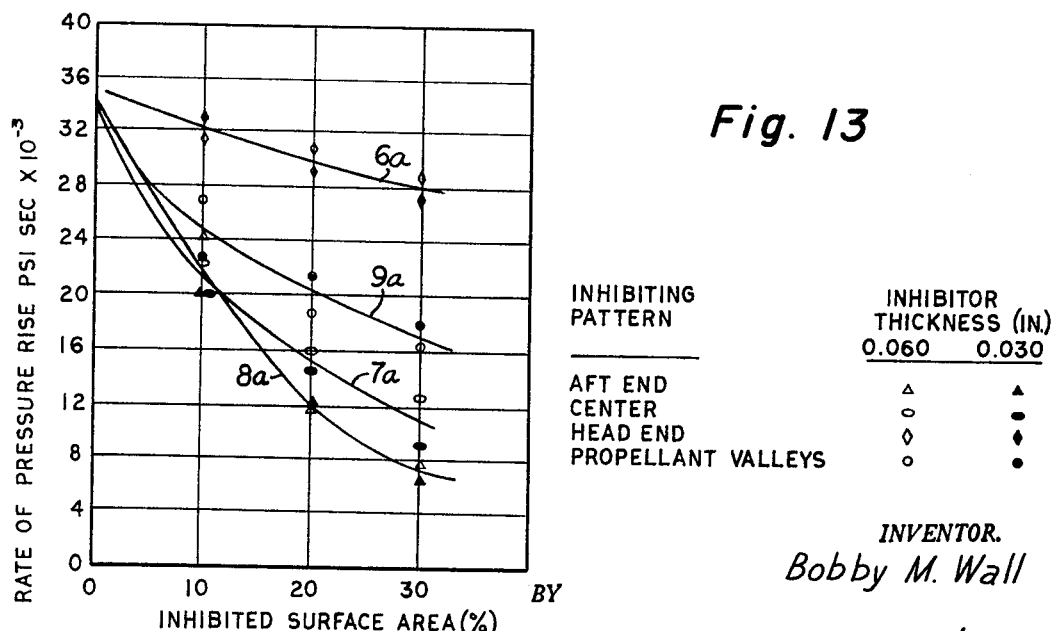
Figure 14:
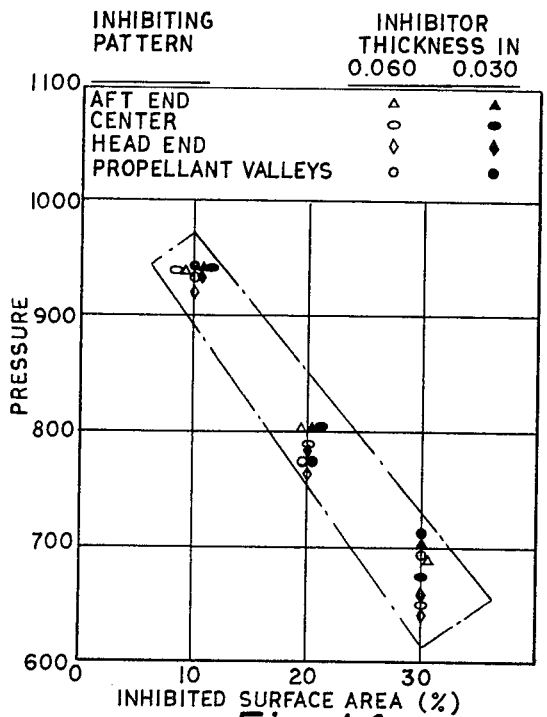
Figure 16:
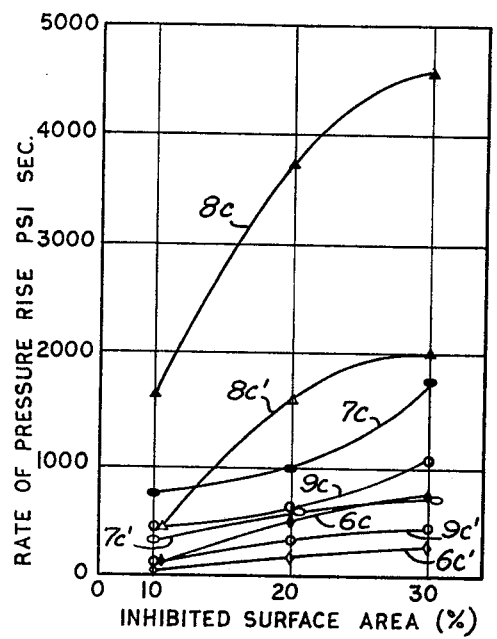
Figure 15:
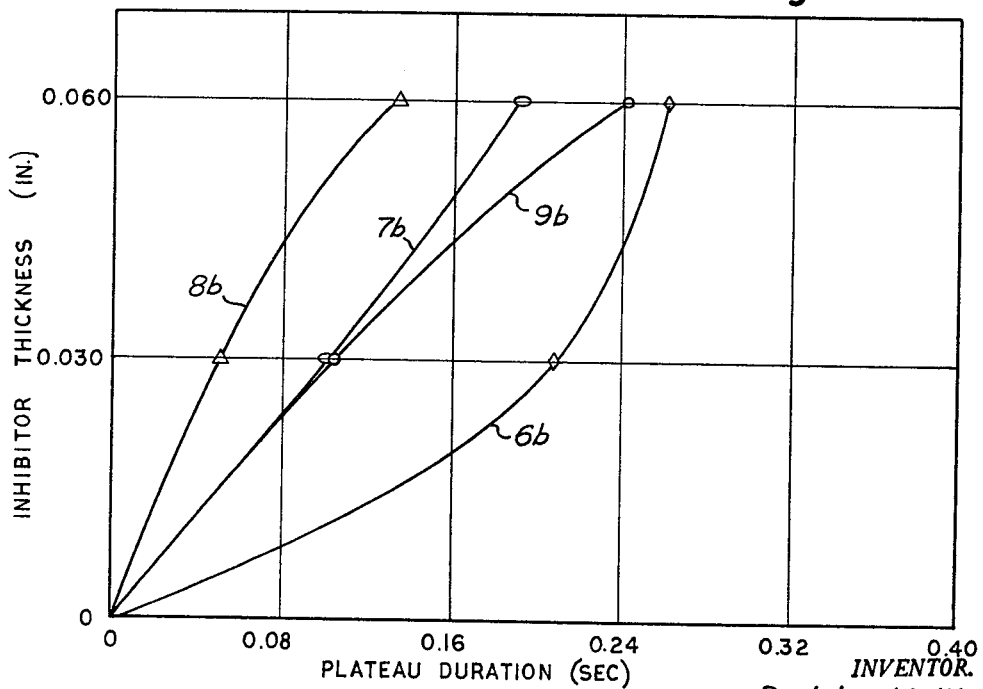
Figure 17:
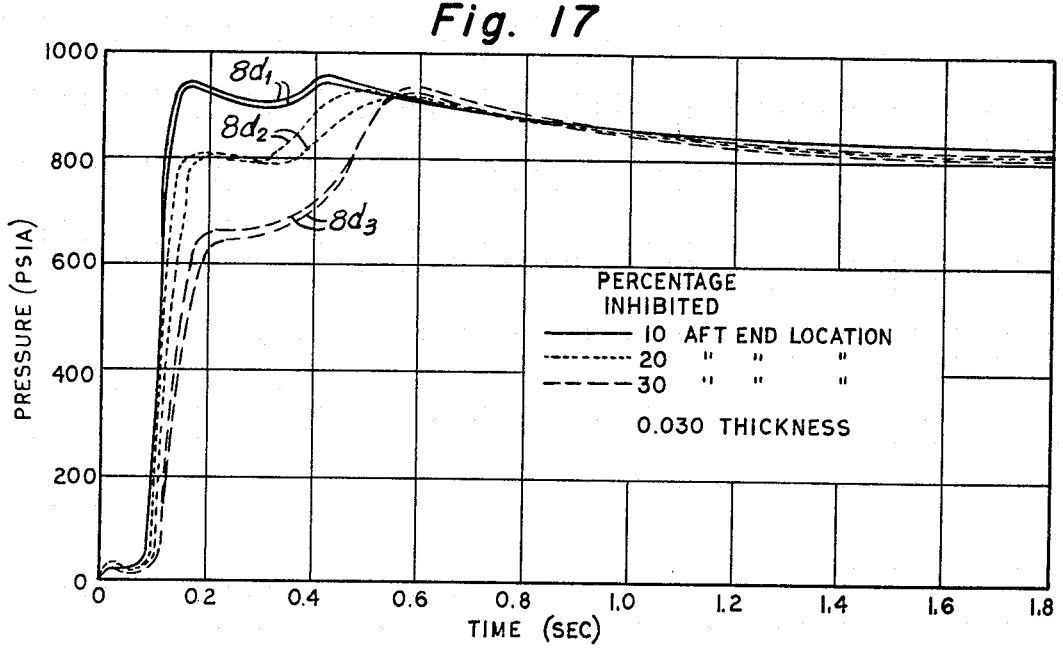
Figure 18:
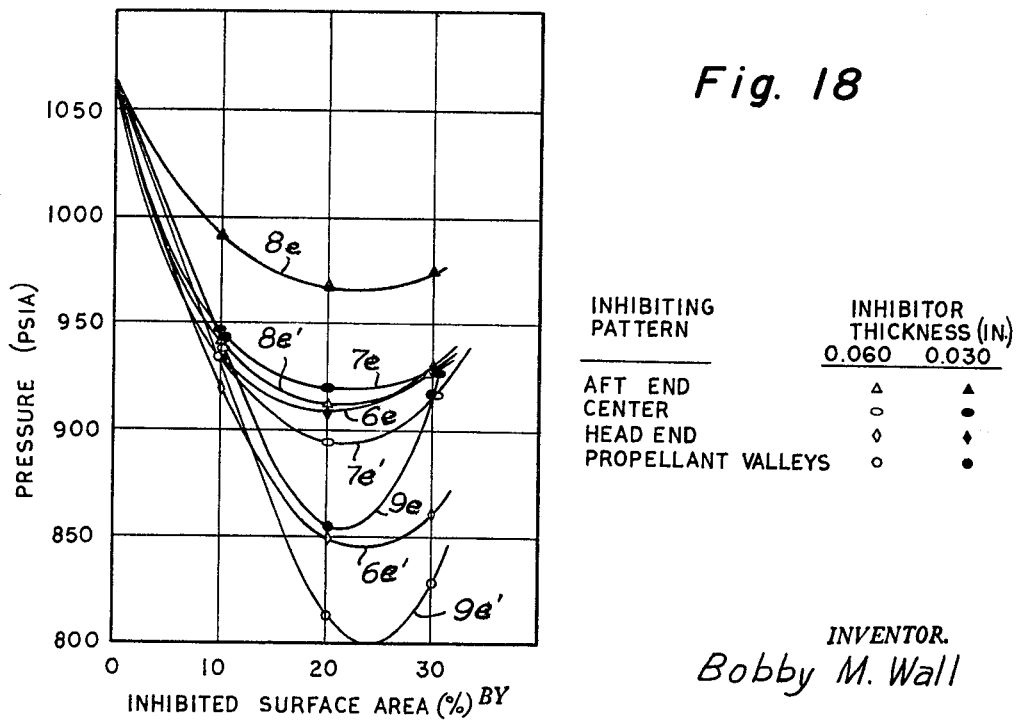

FIGURES 6, 7, 8, and 9 are sectional views of a typical solid-propellant rocket engine showing how the combustion-inhibiting composition may be incorporated into the forward-end portion, the central portion, the aft-end portion, and the "star valleys," respectively, of the ignition surface of a propellant charge;

FIGURE 10 is a cross section taken on the line 10—10 of FIGURES 6, 7, and 8;

FIGURE 11 is a cross section taken on the line 11—11 of FIGURE 9;

FIGURE 12 is a graph showing typical pressure vs. time curves obtained upon ignition of the rocket motors shown in FIGURES 6, 7, 8 and 9, as compared with that of a rocket motor untreated with inhibiting composition;

FIGURE 13 is a chart showing curves in which inhibited surface area is plotted against rate of pressure rise for different locations and thickness on the propellant grain;

FIGURE 14 is a chart showing the location of the same reference data points when inhibited surface area is plotted against the initial pressure produced before the inhibitor is consumed;

FIGURE 15 is a chart showing the curves drawn through the same reference data points when the period of duration of the initial pressure is plotted against inhibitor thickness;

FIGURE 16 is a chart showing the curves drawn through the same reference data points when the inhibited surface area is plotted against the pressure rise after the inhibitor has been consumed;

FIGURE 17 is a chart showing the reproducibility of the curves from experimental data as well as the shape of the typical pressure-time trail resulting from changing the percent surface inhibited; and FIGURE 18 is a chart showing the curves drawn through the same reference data points when the inhibited surface area is plotted against the final pressure in the combustion chamber.

Figures 1, 2:
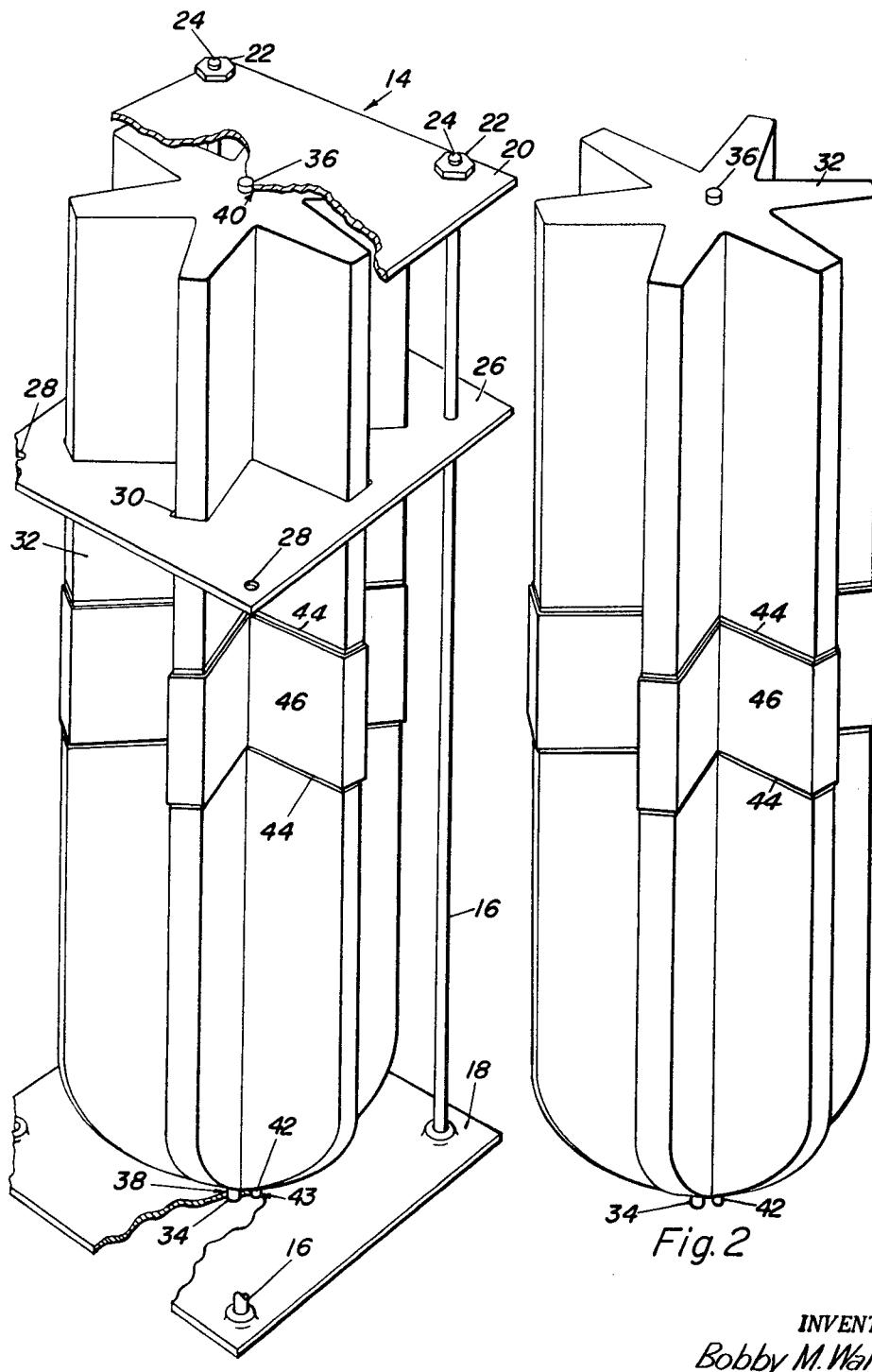
FIGURE 1 is a perspective view of an apparatus incorporating the present invention and showing how it is used to apply a combustion-inhibiting composition to the surface of a mandrel of the kind used for forming the internal cavity of a solid propellant rocket engine.
FIGURE 2 is a perspective view of such a mandrel showing the combustion-inhibiting composition thereon prior to molding an internal cavity in a solid-propellant charge.

A preferred form of apparatus 14 incorporating my invention is shown in FIGURE 1 as comprising essentially a plurality of parallel guide columns 16 fixed at one end to an end support 18 and extending through appropriately spaced holes in an end support 20 at the opposite ends of the rods. End support 20 is confined between shoulders, not shown, on guides 16 and nuts 22 screwed on the threaded end portions 24 of the guides. A shaping template 26 is mounted for sliding movement upon the guides 16 by a means of holes 28 therein through which the guide columns 16 extend. The shaping template 26 has a central aperture 30 conforming to a cross-sectional configuration of the mandrel 32 to which the combustion-inhibiting composition is to be applied. However, the aperture 30 is larger than the cross-sectional configuration of mandrel 32 to provide a uniform space between the aperture 30 and the surface of the mandrel 32 corresponding to the desired thickness of the combustion-inhibiting composition to be applied to the mandrel.

In practice, the apparatus described is assembled on the mandrel 32 to which the combustion-inhibiting composition is to be applied. To this end, a pin 34 projecting from the forward end of the mandrel 32 along the central axis thereof is fitted into a central hole 38 in the end support 18 and an index pin 42 projecting from said forward end of the mandrel near the pin 34 is fitted into an index hole 43 in the end support 18 for proper angular orientation of the mandrel 32 relative to the apparatus 14. The shaping template 26 is then fitted over and slid onto the guide columns 16. A pin 36, similar to pin 34, projecting from the rearward end of mandrel 32 is fitted into a central hole 40 in the end support 20, the threaded ends 24 of the guide columns 16 are projected through alining holes in the end support and the nuts 22 are screwed onto the threaded ends of the guide columns to securely fasten the end support thereto and confine the mandrel firmly between the end supports 18 and 20.

The location of the combustion-inhibiting composition on the mandrel is then defined by applying masking tape 44 to the mandrel 32. The shaping template 26 is then moved to one side of the area to be coated and the inhibiting composition 46 is generously applied to that area. The shaping template 26 is then reciprocated over the combustion-inhibiting composition, scraping away the excess and leaving a smooth layer of the composition of uniform thickness upon the surface of the mandrel 32. Any excess composition extending from the area intended to be covered onto the masking tape is then removed by removing the masking tape to provide a predetermined area of the mandrel surface, only, which is covered by the composition. The mandrel 32 is then removed from the apparatus 14 and the combustion-inhibiting composition 46 upon the mandrel is subjected to a partial cure at an elevated temperature, after which the mandrel may be inserted into a rocket engine case and uncured propellant cast around it. When the properlant charge has solidified, a mandrel is withdrawn in a conventional manner, leaving the combustion-inhibiting composition integrated into the surface of the propellant over a desired portion thereof.

The combustion-inhibiting composition 46 is described above as an elastomeric sealant and such sealants commonly comprise an organic polymer and inorganic filler, with or without minor amounts of burning rate modifiers. One such specific sealant material that has been found satisfactory has the following composition:

| | Percent |
|---|---|
| Polybutadiene acrylic acid acrylonitrile terpolymer | 46.70 |
| Carbon particles (finely divided) | 49.00 |
| Tris [1-(2-methyl)aziridinyl] phosphine oxide | 1.40 |
| Iron octoate (6%) (Ferric salt of 2-ethyl hexanoic acid in a 6% solution, or ferric-2-ethyl hexoate | .90 |
| O,N,N' - tri-(2-3-epoxypropyl)-p-aminophenol, an epoxy resin as manufactured by Union Carbide and designated ERL-0510 | 1.00 |
| Triglyceride of hydroxy stearic acid | 1.00 |
| | 100.00 |

The shaping template 26 illustrated as part of the apparatus 14 in FIGURE 1, is usable only with mandrels that are essentially cylindrical in form, i.e., having surface generated by a moving line that is always parallel to the central axis of the mandrel. FIGURE 3 illustrates a shaping template 26a which can be used with mandrels that are divergent from the forward end of the aft end thereof. In this modification of the shaping template, the aperture 30a in the template is adapted to flex from the smaller to the larger dimensions of the mandrel by means of an elastic diaphragm 48 which is tightly confined between the two laminae 50 and 52, see FIGURE 4, providing a rigid support for the structural portion of the shaping template 26a by means of the screws 54. The inner edges of the diaphragm 48 are attached to an elastic strap 56 that is maintained at a constant distance from the surface of the mandrel 32 by a plurality of spaced sharp-edged wheels 58. As shown in FIGURE 4, the wheels 58 are mounted in pairs, at opposite sides of the supporting laminae 50 and 52, in bearings that are fixed to the outer edge of the elastic strap 56. This embodiment of the shaping template may be used in identical fashion to that previously described.

FIGURE 5 illustrates an alternate method of applying the combustion-inhibiting composition 46 to the mandrel 32. In this process, the combustion-inhibiting composition is formed into sheets of the desired thickness by calendering in a conventional manner, and the sheets 60 of inhibiting composition may be applied without apparatus to the mandrel. These sheets 60 are tacky enough to adhere to the surface of the mandrel without the aid of any bonding agent. The mandrel may then be used in identical fashion to that previously described.

The effect upon rocket engine performance of the ignition surface area that has been inhibited in this manner varies considerably according to its location within the rocket motor. FIGURES 6, 7, 8 and 9 illustrate various locations of the combustion-inhibiting composition on the ignition surfaces of propellant charges that have been tested in rocket motors, and FIGURE 12 is a graph showing the resulting thrust v. time curves for each location. Curve 62 is typical of a solid propellant rocket engine in which the ignition surface is uninhibited and the undesirable initial pressure peak is clearly evident. Curve 6 resulted when the combustion-inhibiting composition was located toward the forward end of the ignition surface of the rocket motor as in FIGURE 6 and it will be observed that the initial pressure is lower than that resulting from any of the other three locations shown, but the time necessary for the motor to achieve operating pressure is greater. Curve 7 resulted when the central portion of the ignition surface was inhibited as shown in FIGURE 7 and the initial pressure peak of this curve is somewhat higher than that of curve 6, but the time necessary for the engine to achieve operating pressure is less. Curve 8 resulted when the aft-end portion of the ignition surface was inhibited as illustrated in FIGURE 8 and shows that the initial pressure peak of this curve is higher than that of the two preceding curves, but the time necessary for the engine to achieve operating pressure is much shorter. Curve 9 is considered to be optimum for some applications and shows that the rocket motor achieves its operating pressure very rapidly and that the initial pressure peak is quite low. This is the curve that results when only the "star valleys" of the ignition surface are inhibited as shown in FIGURES 9 and 11. The optimum rate of pressurization will depend upon many factors and necessarily all of these are not discussed herein.

FIGURES 13 to 18 show other relationships resulting from variations in the percentage amount of surface area of the propellant grain which is inhibited, the location of the inhibited area and the thickness of the layer of inhibiting material, each of which factors may be controlled to produce a desired rate of pressure increase, a particular period of dwell between the initial and final pressure increases corresponding to time required to consume the inhibiting material, the rate of pressure increase after the inhibitor is consumed and the ultimate pressure for a particular condition in a rocket engine.

FIGURE 13 is a graph of four different curves 6a, 7a, 8a and 9a showing the percent of the surface area inhibited plotted against the rate of pressure rise in pounds per square inch, per thousandths of a second. The curve 6a shows the relationship when the inhibitor is applied at the head end of the propellant grain as shown in FIGURE 6 and its relationship to two different sets of reference data points for an inhibitor 0.03 inch and 0.06 inch thick, respectively. Curve 7a shows the rate of pressure rise in relation to the inhibited surface area the same as the curve 6a, when the inhibitor is applied to the center of the propelalnt grain as illustrated in FIGURE 7. The curve 8a shows the corresponding relationship when the inhibitor is applied to the aft end of the grain as illustrated in FIGURE 8; and FIGURE 9 shows the relationship when the inhibitor is applied to the star valleys of the grain as illustrated in FIGURES 9 to 11. It will be observed from the curves 6a to 9a of the graph in FIGURE 13 that the rate of pressure rise varies from a minimum when the inhibitor is applied at the aft end to a maximum when applied to the forward or head end with the center and star valley locations between the minimum and maximum. This is due to the fact that the igniting flame is propagated from the forward end and burns and/or erodes the inhibitor in varying degrees from the front to the rear of the propellant grain. Therefore, when a particular rate of pressure increase is desired, a location for the inhibitor on the grain would be selected in accordance with the curves in FIGURE 13 to produce that result.

FIGURE 14 illustrates the relationship between the amount of inhibited surface area and initial pressure produced by ignition of the propellant grain, but before the inhibitor is completely burned as in the curves in the chart in FIGURE 13. The reference data points are shown for the different locations of the inhibitor on the propellant grain and for layers of inhibitor of two different thicknesses. Thus, a particular amount, location and thickness of inhibitor layer can be selected to produce a particular desired initial pressure.

FIGURE 15 illustrates the time period of dwell between the initial and final pressure increases after the propellant grain has been ignited. More specifically, FIGURE 15 illustrates four curves 6b, 7b, 8b, and 9b in which time is plotted against inhibitor thickness to show the dwell or plateau between the initial and final pressure increases in the rocket engine combustion chamber for the same four locations of inhibitor. Thus, if a plateau of long duration is desired, as in the curve 6 in FIGURE 12, a thick layer of inhibitor would be best at the head end of the solid propellant grain, but if a plateau of minimum duration is desired, a thin layer of inhibitor would be applied to the aft end of the propellant grain.

FIGURE 16 illustrates the rate at which the secondary rise in pressure occurs after all of the inhibitor has been burned from the surface of the grain. The curves 6c, 7c, 8c, and 9c show the amount of inhibited surface area plotted against the pressure rise in pounds per square inch, per second, for the four different locations of the inhibitor. The other set of curves 6c', 7c', 8c' and 9c' show the same relation for a layer of inhibiting material having twice the thickness. With the information illustrated in FIGURE 16, an inhibiting layer of the proper thickness and location can be selected to produce the desired rate of the secondary increase in pressure.

FIGURE 17 illustrates a plurality of curves made from data of different tests for each condition to show the reproducible results with typical transient variations resulting from modifying the percentage of surface inhibited. Each pair of curves 8d1, 8d2 and 8d3 shows the time vs. pressure curves when the inhibitor is applied to the aft end in varying amounts of 10%, 20% and 30% respectively, so that a particular percentage of inhibitor can be selected to produce the desired condition.

FIGURE 18 illustrates the ultimate pressure produced in the combustion chamber of a typical solid propellant rocket engine. Curves 6e, 7e, 8e and 9e show the amount of surface area inhibited when plotted against the pressure produced by burning the propellant grain when a layer of inhibitor of 0.03 inch is applied at the different locations; while curves 6e', 7e', 8e' and 9e' show the total pressure when a layer of the same inhibitor 0.060 inch thick is applied at the different areas.

For example, if the pressure pattern illustrated in the curve 6 of FIGURE 12 is to be produced, about 10% of the surface area of the propellant grain would be coated at its head end with a thickness of .030 inch, see FIGURE 18. Referring back to FIGURE 13, the rate of pressure rise would be approximately 33 p.s.i., per thousandth of a second and the plateau pressure would be approximately 940 p.s.i., see FIGURE 14. The duration of the plateau pressure would be approximately 0.2 second, see FIGURE 15. The rate of pressure increase in the secondary pressure rise would be approximately .080 pound per square inch, per thousandths of a second, and the total maximum pressure produced in the combustion chamber of the rocket engine would be approximately 940 pounds per square inch.

On the other hand, if a pressure pattern like that illustrated in curve 8 of FIGURE 12 is desired, a 20% area of the surface of the propellant grain would be coated at the aft end with a thickness of .030 inch. The initial rate of pressure rise would then be 13 p.s.i., per thousandth of a second, see FIGURE 13; the initial plateau pressure would be 800 p.s.i., see FIGURE 14; the duration of the initial pressure would be .05 sec., see FIGURE 15; the secondary rate of pressure rise would be 3.7 p.s.i., per thousandth of a second; and the maximum total pressure in the combustion chamber would be 970 p.s.i.

A method and apparatus has been described for incorporating a combustion-inhibiting composition with precision as to thickness and location within the ignition surface of a solid-propellant rocket charge. Although the description has been written with some degree of detail, it is to be understood that a considerable number of alternative means may be employed within the spirit and scope of the invention. For example, various compositions may be employed to inhibit combustion, and the apparatus described can be altered greatly and yet perform the same function in the same manner. Also, it can be seen that, by means of my invention, the performance of a rocket motor can be influenced to a considerable extent.

I claim:

1. The method of selectively predetermining the pressure pattern produced in a rocket engine subsequent to ignition by a grain of solid propellant having an internal cavity extending throughout its length to provide an internal surface area subject to ignition comprising the step of applying a peripheral band of combustion-inhibiting composition around the internal cavity to cover a selected portion of the surface area subjected to ignition which will produce the particular thrust versus time effect desired.

2. The method of predictably lowering the initial pressure and delaying attainment of full operating pressure in a rocket engine having a grain of solid propellant having an internal cavity extending throughout its length to provide an ignition surface area on the propellant comprising the steps of bonding a peripheral band of combustion-inhibiting composition to a portion of the ignition surface area surrounding the internal cavity, and positioning the band of combustion-inhibiting composition on the ignition surface progressive nearer the end opposite the nozzle to produce a correspondingly lower ignition pressure and delay attainment of the full operating pressure.

3. The method of selectively predetermining the pressure pattern produced in a rocket engine subsequent to ignition by a solid propellant grain having an internal cavity extending throughout its length to provide an internal surface area subject to ignition comprising the steps of applying a band of combustion-inhibiting composition around the internal surface area of the propellant grain subject to ignition, and varying the area and location of the band of inhibitor to vary the pressure produced by the burning propellant and the period of time required to burn the propellant.

4. The method of selectively predetermining the pressure pattern produced in a rocket engine in accordance with claim 3 which comprises varying the location of the inhibitor along the surface of the solid propellant from the forward to the aft end thereof to vary the pressure pattern produced by the propellant when burned.

5. The method of selectively predetermining the pressure pattern produced in a rocket engine in accordance with claim 3 which comprises varying the thickness of the layer of inhibitor to vary the pressure pattern produced by the propellant when burned.

6. The method of selectively predetermining the pressure pattern produced in a rocket engine in accordance with claim 3 which comprises varying the amount of area and location of an inhibiting layer along the surface of the solid propellant from the forward to the aft end thereof, and varying the thickness of the layer of inhibiting material to vary the pressure pattern produced by the propellant when burned.

References Cited

UNITED STATES PATENTS

| | | | |
|---|---|---|---|
| 2,813,487 | 11/1957 | Miller et al. | 102—98 |
| 3,008,417 | 11/1961 | Keathley et al. | 60—35.6 X |
| 3,014,427 | 12/1961 | Scurlock | 102—98 |
| 3,017,744 | 1/1962 | Jett | 60—35.6 |
| 3,157,025 | 11/1964 | Herring | 60—35.6 |

OTHER REFERENCES

Jet Propulsion, February 1956, volume 26, No. 2 (pp. 102–105 relied on).

CARLTON R. CROYLE, *Primary Examiner.*